United States Patent
Kalina

(10) Patent No.: US 6,829,895 B2
(45) Date of Patent: Dec. 14, 2004

(54) GEOTHERMAL SYSTEM

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 0 days.

(21) Appl. No.: 10/242,301

(22) Filed: Sep. 12, 2002

(65) Prior Publication Data

US 2004/0050048 A1 Mar. 18, 2004

(51) Int. Cl.$^7$ ............................................. F01K 25/06
(52) U.S. Cl. ............................ 60/649; 60/653; 60/671; 60/676
(58) Field of Search ........................ 60/649, 653, 670, 60/671, 676, 679

(56) References Cited

U.S. PATENT DOCUMENTS

| | | | |
|---|---|---|---|
| 4,164,849 A | * 8/1979 | Mangus | 60/679 |
| 4,346,561 A | 8/1982 | Kalina | 60/641.6 |
| 4,489,563 A | 12/1984 | Kalina | 60/673 |
| 4,548,043 A | 10/1985 | Kalina | 60/649 |
| 4,586,340 A | 5/1986 | Kalina | 60/649 |
| 4,604,867 A | 8/1986 | Kalina | 60/653 |
| 4,619,809 A | * 10/1986 | Schluderberg | 376/402 |
| 4,674,285 A | 6/1987 | Durrant et al. | 10/646 |
| 4,732,005 A | 3/1988 | Kalina | 60/649 |
| 4,763,480 A | 8/1988 | Kalina | 60/678 |
| 4,899,545 A | 2/1990 | Kalina | 60/673 |
| 4,982,568 A | 1/1991 | Kalina | 60/649 |
| 5,029,444 A | 7/1991 | Kalina | 60/673 |
| 5,038,567 A | * 8/1991 | Mortiz | 60/641.5 |
| 5,095,708 A | 3/1992 | Kalina | 60/673 |
| 5,440,882 A | 8/1995 | Kalina | 60/641.2 |
| 5,450,821 A | 9/1995 | Kalina | 122/1 R |
| 5,572,871 A | 11/1996 | Kalina | 60/649 |
| 5,588,298 A | 12/1996 | Kalina et al. | 60/676 |
| 5,603,218 A | 2/1997 | Hooper | 60/655 |
| 5,649,426 A | 7/1997 | Kalina et al. | 60/649 |
| 5,754,613 A | 5/1998 | Hashiguchi et al. | 376/378 |
| 5,784,888 A | * 7/1998 | Termuehlen | 60/677 |
| 5,822,990 A | 10/1998 | Kalina et al. | 60/649 |
| 5,950,433 A | 9/1999 | Kalina | 60/649 |
| 5,953,918 A | 9/1999 | Kalina et al. | 60/653 |
| 6,058,695 A | * 5/2000 | Ranasinghe et al. | 60/39.182 |
| 6,347,520 B1 | 2/2002 | Ranasinghe et al. | 60/649 |

* cited by examiner

*Primary Examiner*—Hoang Nguyen
(74) *Attorney, Agent, or Firm*—Robert W Strozier

(57) ABSTRACT

A new system and method for extracting useful work from geothermal streams is disclosed. The systems and methods of this invention can achieve an estimated 20 to 30% improvement in output efficiency. The increased efficiency is derived from a secondary energy conversion step involving a low pressure vapor stream of variable composition and a low pressure turbine, which expands the vapor stream to produce the improved efficiency.

18 Claims, 3 Drawing Sheets

GEOTHERMAL SYSTEM

BACKGROUND OF THE INVENTION

1. Field of the Invention

The present invention relates to a process and system to convert thermal energy from moderately low temperature sources, especially from geothermal fluids, into mechanical and electrical energy.

More particularly, the present invention relates to a process and system to convert thermal energy from moderately low temperature sources, especially from geothermal fluids, into mechanical and electrical energy, where a working fluid comprises a mixture of at least two components, with the preferred working fluid comprising a water-ammonia mixture.

2. Description of the Related Art

Prior art methods and systems for converting heat into useful energy at well documented in the art. In fact, many such methods and systems have been invented and patented by the inventor. These prior art systems include U.S. Pat. Nos. 4,346,561, 4,489,563, 4,548,043, 4,586,340, 4,604, 867, 4,674,285, 4,732,005, 4,763,480, 4,899,545, 4,982,568, 5,029,444, 5,095,708, 5,440,882, 5,450,821, 5,572,871, 5,588,298, 5,603,218, 5,649,426, 5,822,990, 5,950,433 and 5,593,918; Foreign References:7-9481 JP and Journal References: NEDO Brochure, "ECO-Energy City Project", 1994 and NEDO Report published 1996, pp. 4–6, 4–7, 4–43, 4–63, 4–53, incorporated by reference.

Although all of these prior art systems and methods relate to the conversion of thermal energy into other more useful forms of energy, all suffer from certain inefficiencies. Thus, there is a need in the art for an improved system and method for converting thermal energy to more useful forms of energy, especially for converting geothermal energy into more useful forms of energy.

SUMMARY OF THE INVENTION

The present invention provides a process for converting thermal energy from moderately low temperature sources, especially from geothermal fluids, into mechanical and/or electrical energy, where the process includes the steps of expanding a fully vaporized, high pressure, working fluid stream, transforming its energy into usable form and producing a returning or spent, low pressure, stream. The fully vaporized working stream is produced by evaporating an upcoming liquid working stream using heat derived from a heating stream from an external heat source, a sufficient portion of the spent, low pressure, stream, and a first portion of a vapor sub-stream derived from the sufficient portion of the spent, low pressure, stream after partial condensation in heating the upcoming liquid working stream to form the fully, high pressure, vaporized working stream. An additional amount of usable energy is derived from expanding a second portion of a vapor sub-stream derived from the sufficient portion of the spent, low pressure, stream after partial condensation and a remainder portion of the spend, low pressure, stream, transforming its energy into usable form and producing a secondary returning or spent stream, where an amount of usable energy is increased from about 20% to about 30% over prior art processes.

The present invention provides a system including a multi-component basic working fluid, a geothermal source stream, and a cooling stream. The system further includes equipment necessary to establish a thermodynamic cycle capable of converting from about 20% to about 30% more thermal energy into mechanical energy than the prior art thermodynamic process of U.S. Pat. No. 4,982,568. A preferred system includes six heat exhangers, two pumps, a separator and a throttle valve.

The present invention provides an apparatus including a means for expanding a fully vaporized working stream, transforming its energy into usable form and producing a spent stream; a first heat exchange zone for cooling an external heat source and transferring heat from the external heat source to a heated upcoming liquid working stream to form the fully vaporized working stream; and a second heat exchange zone for partially condensing a sufficient portion of the spent stream to form a partially condensed sufficient portion of the spent stream and for transferring heat from the sufficient portion of the spent stream to a pre-heated upcoming liquid working stream. The apparatus also includes a pre-heater for partially condensing a first portion of a vapor sub-stream separated from the condensed sufficient portion of the spent stream to form a primary spent stream and for transferring heat from the vapor sub-stream to an upcoming liquid working stream and a means for expanding a second portion of the vapor sub-stream and a remaining portion of the spent stream, transforming their energy into usable form and producing a secondary spent stream. The apparatus further includes a means for condensing the primary and secondary spent stream into the upcoming liquid working stream.

DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found that a new and more efficient system and method can be constructed and designed to convert heat from a geothermal source into a more useful form of energy. The system uses a multi-component basic working fluid to extract energy from one or more (at least one) geothermal source streams in one or more (at least one) heat exchangers or heat exchanges zones. The heat exchanged basic working fluid then transfers its gained thermal energy to one or more (at least one) turbines converting the gained thermal energy into mechanical energy and/or electrical energy. The system also includes pumps to increase the pressure of the basic working fluid at certain points in the system and one or more (at least one) heat exchancers which bring the basic working fluid in heat exchange relationships with one or more (at least one) cool streams.

This proposed system utilizes a novel thermodynamical cycle (process). The basic working fluid includes a mixture of at least two components, with the preferred basic working fluid including a water-ammonia mixture, though other mixtures, such as mixtures of hydrocarbons and/or freons can be used with practically the same results.

The basic working fluid used in the systems of this inventions preferably is a multi-component fluid that comprises a lower boiling point fluid—the low-boiling component—and a higher boiling point fluid—the high-boiling component. Preferred working fluids include an ammonia-water mixture, a mixture of two or more hydrocarbons, a mixture of two or more freons, a mixture of hydrocarbons and freons, or the like. In general, the fluid can comprise mixtures of any number of compounds with favorable thermodynamic characteristics and solubility. In a particularly preferred embodiment, the fluid comprises a mixture of water and ammonia.

Figure 1:
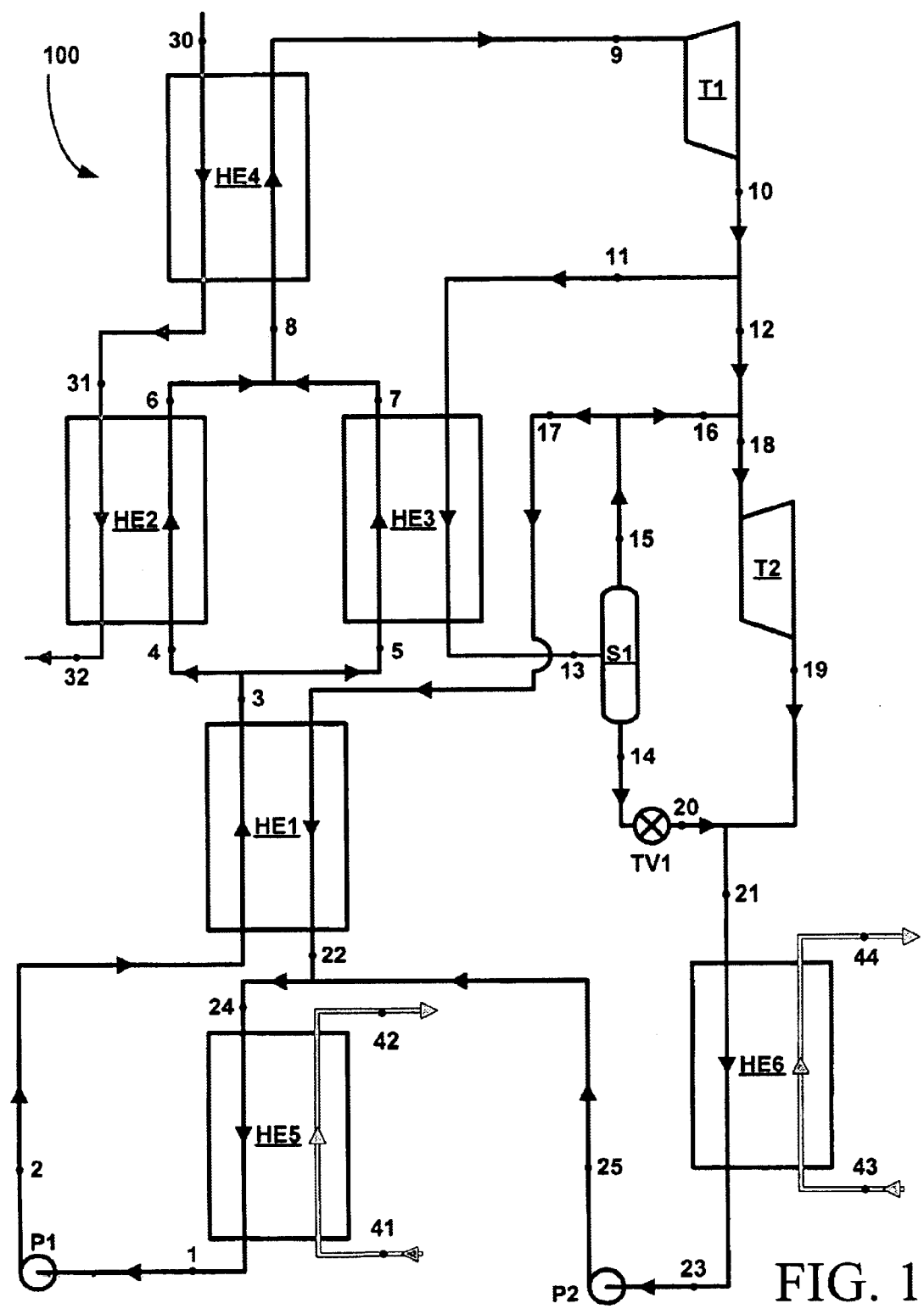
FIG. 1 depicts a diagram of a preferred embodiment of a system of this invention for converting heat from a geothermal source to a useful form of energy.

Referring now to FIG. 1, a flow diagram, generally 100, is shown that illustrates a preferred embodiment a system and method of energy conversion of this invention. The system 100 will be described in terms of its components and its operation below.

A fully condensed basic working fluid stream at a temperature close to ambient temperature and having parameters as at a point 1 enters into a pump P1, where the stream is pumped to a desired pressure and obtains parameters as at a point 2. The stream, with parameters as at the point 1, corresponds to a state of saturated liquid of the basic working fluid. The basic working fluid comprises a mixture of at least two components, preferably, a mixture of ammonia and water. As a result of pumping, the liquid stream of the basic working fluid at the point 2 is in a state of sub-cooled liquid. Thereafter, the liquid stream, with parameters as at the point 2, passes through a pre-heater HE1, i.e., a heat exchanger, where it is heated by a counter-flow stream of a fluid, (see below), and the basic working fluid obtains parameters as at a point 3. In most cases, the liquid basic working fluid stream, with parameters as at the point 3, is in a state of saturated or slightly sub-cooled liquid.

Thereafter, the liquefied basic working fluid stream, with parameters as at the point 3, is divided into two sub-streams, having parameters as at points 4 and 5, respectively. The sub-stream with parameters as at a point 4 is directed into a heat exchanger HE2, where it is heated and partially vaporized by a counter-flow stream of a geothermal fluid, and obtains parameters as at a point 6.

The sub-stream of basic working fluid stream, with parameters as at the point 5, passes through a heat exchanger HE3, where it is heated and partially vaporized, by a counter-flow stream of condensing basic working fluid (see below), and obtains parameters as at a point 7. The compositions, temperatures and pressures of the basic working fluid at the points 6 and 7 are substantially the same.

Thereafter, the sub-streams with parameters as at the points 6 and 7 are recombined, forming a stream of basic working fluid, with parameters as at a point 8. The stream of basic working fluid, with parameters as at the point 8, passes through a heat exchanger HE4, where it is heated and fully vaporized, and may even be superheated, by the counter-flow stream of geothermal fluid, and as a result, obtains parameters as at a point 9. The stream of geothermal fluid (or another fluid which is the source of heat), with initial parameters as at a point 30, passes through the heat exchanger HE4 in counter-flow to the recombined stream of basic working fluid, where the geothermal fluid is cooled, providing heat for a process 8–9 (see above) and obtains parameters as at a point 31.

Thereafter, the stream of geothermal fluid, with parameters as at the point 31, passes through the heat exchanger HE2, where it is further cooled, providing heat for a process 4–6, and obtaining parameters as at a point 32, and is then removed from the system.

Figure 2:
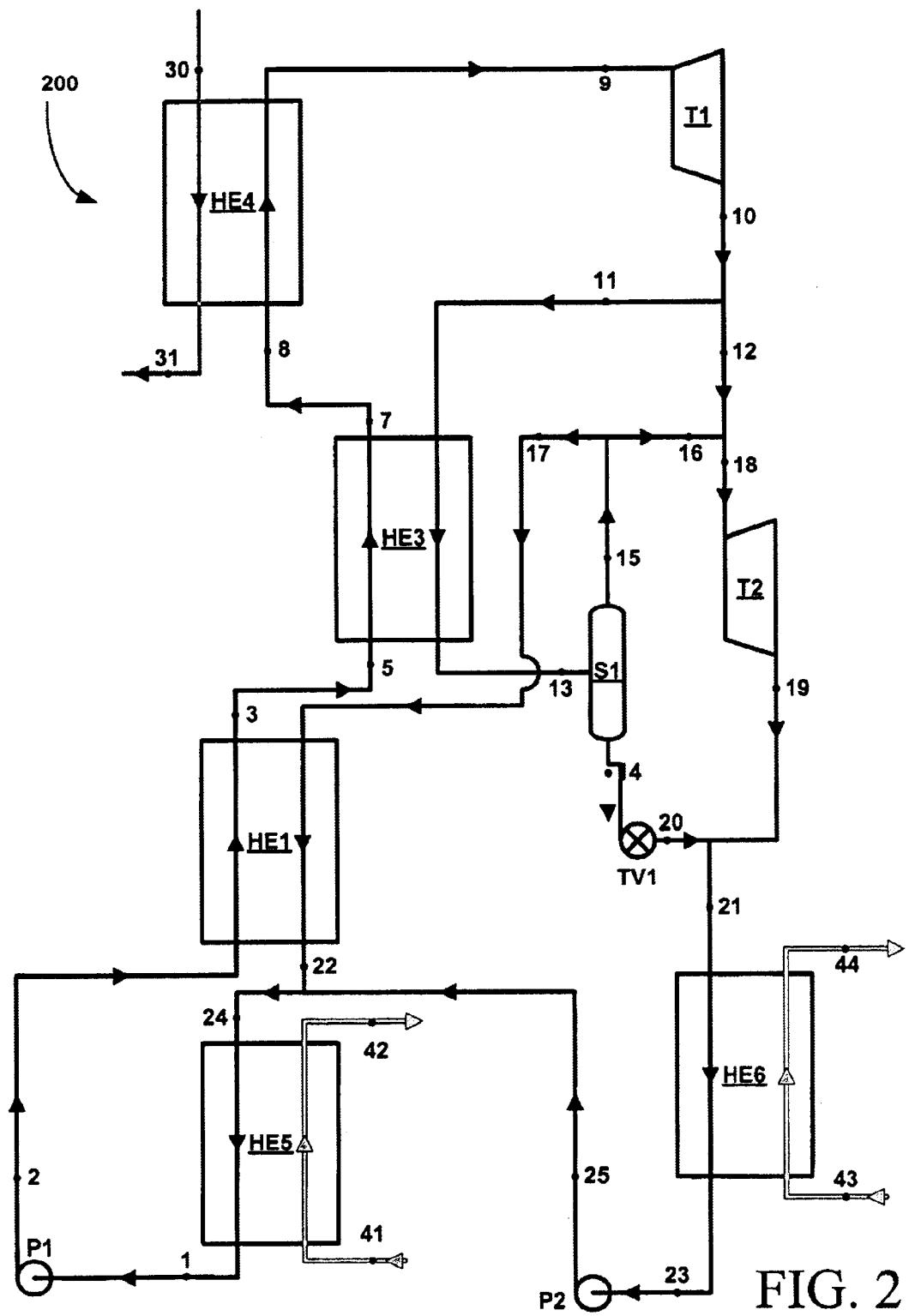
FIG. 2 depicts a diagram of another preferred embodiment of a system of this invention for converting heat from a geothermal source to a useful form of energy.

In some conditions, the stream of geothermal fluid, or some other stream of heat carrying fluid, cannot be cooled to a temperature which is low enough to be used in a process 31–32 and the process 4–6. In such a case, the stream of geothermal fluid or other stream is removed from the system, passing only through the heat exchanger HE4. In such a case, another preferred embodiment of the system excludes the heat exchanger HE2, and the whole stream of basic working fluid with parameters as at the point 3 is sent only through the heat exchanger HE3 (see above) as shown in FIG. 2.

The stream of basic working fluid, with parameters as at a point 9 (see above), then passes through a high pressure turbine T1, where it is expanded, producing mechanical work and leaves the turbine T1 as a returning or spent stream of the basic working fluid, with parameters as at a point 10. The pressure of the basic working fluid at the point 10 is chosen to slightly exceed the pressure of the basic working fluid at the point 1. This is necessary to fully condense the stream of the basic working fluid at the given ambient temperature (see above).

The state of the basic working fluid at the point 10 can be a slightly superheated vapor, a saturated vapor, or even a wet vapor and has a pressure lower than the stream of basic working fluid at the point 9. The pressure of the basic working fluide at the point 3 (see above), where boiling of the upcoming basic working fluid begins (see above), is chosen such that condensation of the low pressure stream of basic working fluid, with parameters as at the point 10, starts at a temperature which is higher than a temperature of the stream of basic working fluid at the point 3. This phenomenon, where the initial temperature of condensation of a low pressure stream of basic working fluid is higher than the initial temperature of boiling of a high pressure stream of basic working fluid, is possible only for a basic working fluid comprising a mixture of two or more (at least two) components.

The low-pressure stream of basic working fluid, with parameters as at the point 10, is then divided into two sub-streams having parameters as at points 11 and 12, respectively. The sub-stream, with parameters as at point 11, passes through the heat exchanger HE3, where it cooled and partially condensed, obtaining parameters as at a point 13. Heat released in a process 11–13 is utilized in a boiling process 5–7 (see above). A flow rate of the sub-stream in the process 11–13 is chosen such that a temperature of the stream of basic working fluid at point 13 is higher than a temperature of the sub-stream of basic working fluid at point 5, and corresponds to a desired pre-selected temperature difference. Generally, the sub-stream, with parameters as at the point 11, is sufficient to provided a quantity of heat that when combined with the heat form the geothermal source and the heat from a separated vapor sub-stream, with parameters at a point 17, is sufficient fully vaporize the basic working fluid, with parameters as at the point 9.

Figure 3:
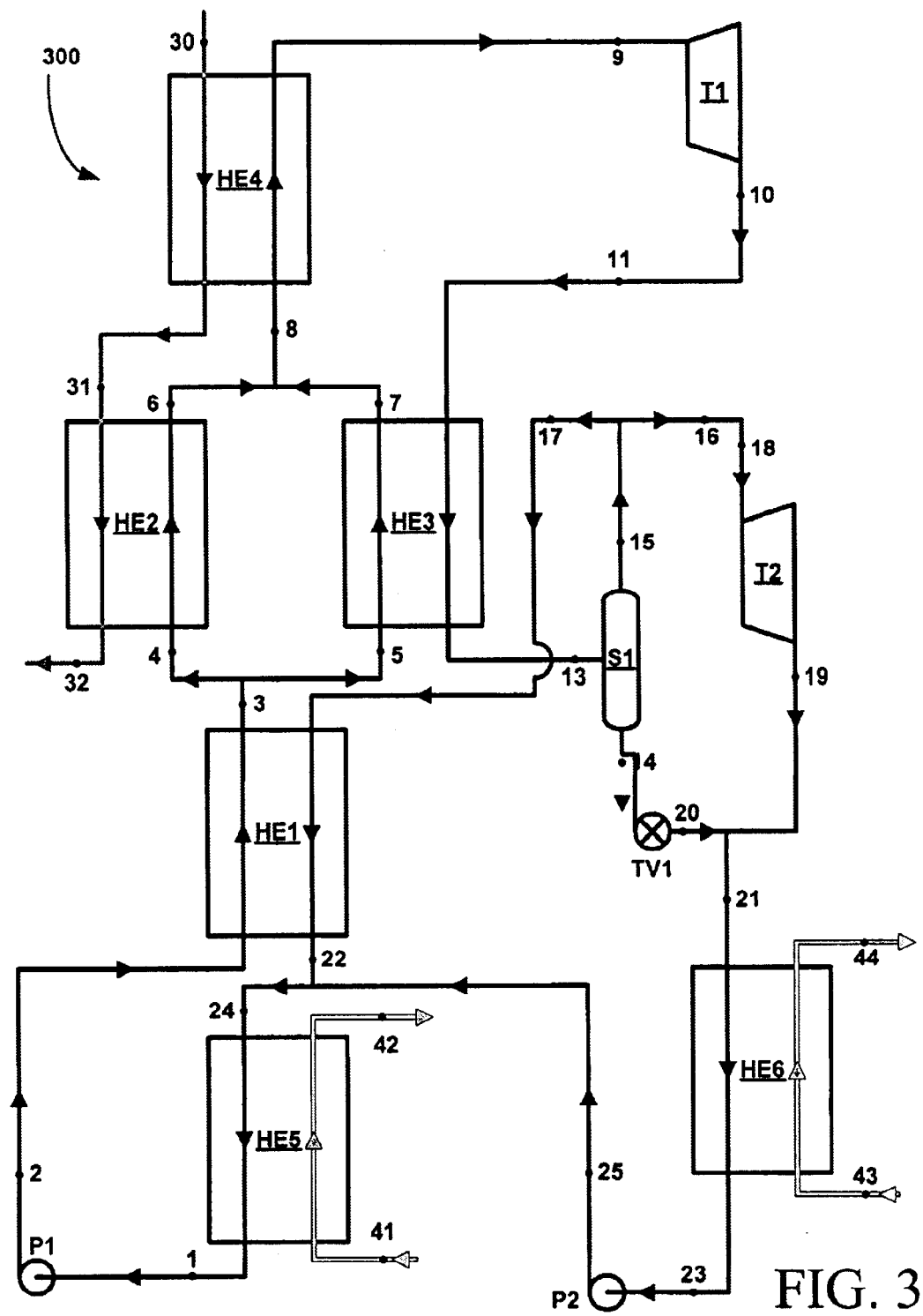
FIG. 3 depicts a diagram of another preferred embodiment of a system of this invention for converting heat from a geothermal source to a useful form of energy.

The composition of the basic working fluid or the pre-selected temperature difference may be chosen so that, in order to provide a heat balance in the process 11–13 vs. the process 5–7, all of the stream of basic working fluid, with parameters as at the point 10, must be sent into the heat exchanger HE3. In this case, another preferred embodiment of the system, generally 300, of this invention as shown in FIG. 3 is shown to exclude a flow path through the point 12 because a flow rate at point 12 would be equal to zero (0) and the stream with parameters as at point 12 would not exist. Such a composition of basic working fluid is the "richest" possible composition, meaning that it has the highest possible concentration of light boiling component (component with the lower boiling temperature, for example ammonia in a water-ammonia mixture). If a "leaner" composition of a working fluid, i.e., one containing a lesser concentration of ammonia, is chosen then only part of the stream with parameters as at the point 10 needs to be sent into the heat exchanger HE3 to provide the heat needed for process 5–7, with the remainder of the stream of basic working fluid passing through a flow path including the point 12.

The sub-stream of returning or spent basic working fluid, with parameters as at the point 13, is always in a state of wet vapor and may contain a significant amount of condensed liquid. The sub-stream, with parameters as at the point 13, is then forwarded to a liquid separator S1, where it is separated into a stream of saturated vapor having parameters as at a point 15 and into a stream of saturated liquid having parameters as at a point 14. The stream of saturated vapor, with parameters as at the point 15, is then divided into two sub-streams having parameters as at points 16 and 17, respectively.

In the separator S1, the sub-stream of basic working fluid is separated into two sub-streams, a separated liquid stream (saturated liquid stream) and separated vapor stream (saturated vapor stream). The concentration of the light boiling component (ammonia) in the separated vapor stream leaving the separator S1 is significantly higher than the concentration of this same component in the basic working fluid as for example at the point 1. Conversely, the concentration of the light boiling component in the separated liquid stream leaving the separator S1 and having parameters as at the point 14 is substantially lower than the concentration of this same component in the basic working fluid as for example at the point 1.

The sub-stream, with parameters as at the point 17, then passes through the heat exchanger HE1, where it is cooled and partially condensed, and obtains parameters as at a point 22. Heat released in a process 17–22 is utilized to provide pre-heating of the upcoming stream of high pressure liquid basic working fluid in the process 2–3 (see above).

The sub-stream of vapor, with parameters as at the point 16, is combined with the sub-stream of vapor basic working fluid (the remaining spent stream), with parameters as at the point 12 (see above), forming a new stream of vapor with parameters as at a point 18.

If one would combine streams with parameters as at the points 22, 18, and 14 into one stream, then such a stream would have a composition identical to that of the basic working fluid, which can be fully condensed at the given ambient temperature at a pressure as of the stream of basic working fluid having parameters as at the point 1. However, if one combines only streams 14 and 18, the composition of the resulting stream would be substantially "leaner" than the composition of the basic working fluid as at the point 1, and, the combined stream can, therefore, be condensed at the ambient temperature at a substantially lower pressure.

Therefore, the stream of vapor with parameters as at the point 18 is sent through a low pressure turbine T2, where it is expanded to produce an additional amount of mechanical work and leaves the low pressure turbine T2 with parameters as at a point 19. The sub-stream of liquid with parameters as at the point 14, then passes though a throttle valve TV1, where its pressure is reduced to a pressure equal to a pressure of the stream at the point 19 (see above) obtaining parameters as at a point 20. Thereafter, the streams with parameters as at the points 19 & 20 are combined, forming a combined stream with parameters as at a point 21. As described above, the composition of the combined stream with parameters as at the point 20 is substantially "leaner" than the composition of the basic working fluid for example at the point 1.

The combined stream with parameters as at the point 21 is then sent to a heat exchanger HE6. In the heat exchanger HE6, the combined stream with parameters as at the point 21 is fully condensed by a stream of ambient cooling fluid (air, water, or other) with parameters as at a point 43, and the combined stream with parameters as at the point 21 obtains parameters as at a point 23, while the cooling fluid leaves the heat exchanger HE6 with parameters as at a point 44.

The stream of condensed liquid with parameters as at the point 23 is then pumped by a pump P2 to form a stream with parameters as at a point 25 having a pressure which is equal or close to a pressure of the stream at the point 22 (see above). Thereafter, the streams with parameters as at the points 22 & 25 are combined into a single stream with parameters as at a point 24. The composition of the stream with parameters as at the point 24 is equal to the composition of the basic working fluid. Thereafter, the stream, with parameters as at the point 24, then passes through a heat exchanger HE5, where it is fully condensed by a stream of ambient cooling fluid (air, water, or other), and obtains parameters as at the point 1. The cooling fluid enters the heat exchanger HE5 with parameters as at a point 41 and leaves the heat exchanger HE5 with parameters as at a point 42. The thermodynamic cycle for the basic working fluid is closed.

In prior art for example as described in U.S. Pat. No. 4,982,568, the whole stream of returning basic working fluid, after being partially condensed in a recuperative boiler-condenser, passes through a pre-heater and is then sent into a condenser. It would correspond as if in the system of FIG. 1, the stream with parameters as at the point 13 would be directly sent into the heat exchanger HE1 and thereafter into the heat exchanger HE5. However, the quantity of heat required for the process of preheating of the basic working fluid in the process 2–3 is several times smaller than the quantity of heat available from the returning condensing stream. As a result, such an imbalance in the heat exchanger causes a substantial increase in the quantity of heat rejected to the ambient or environment in the final condenser and results in substantial energy losses and reduced thermal conversion efficiency.

In contrast, in the proposed system of FIGS. 1–3, an additional energy potential is released and utilized in the low pressure turbine T2. All work produced in turbine T2 constitutes an additional and substantial increase in an output of useful work of the systems of FIGS. 1–3. Preliminary calculations and assessments have shown that this additional increase in output can be an as high as 20–30% of the system of the prior art for example the system of U.S. Pat. No. 4,982,568.

An additional advantage of the systems of this invention is as follows: in the prior art, the composition of the basic working fluid is chosen such that after expansion in a turbine, the whole stream of basic working fluid passes through a recuperative boiler-condenser with the requirement of maintaining a strict heat balance in this heat exchanger. This requires very accurate maintenance of the composition of the basic working fluid. But when ambient conditions change, the composition of the basic fluid must be changed as well.

In contrast, in the systems of this invention, in the general case of FIG. 1, only part of the stream exiting the high pressure turbine T1 is sent into a recuperative boiler-condenser (i.e., heat exchanger HE3). Therefore, the sensitivity of the system's performance to the composition of the basic working fluid is substantially reduced and rigid control of such a composition is unnecessary. Moreover, in the systems of this invention, it is very easy to vary the composition of the basic working fluid. In cases where the composition of the basic working fluid must be made richer, part of the stream with parameters as at the point 25 may be sent into a storage tank and as a result the composition of the stream at the point 24 would become richer as required. To the contrary, if the composition of the basic working fluid needs to be made leaner, then liquid from such a storage tank can be added to the stream with parameters as at the point 25, thus making the composition of the stream at the point 24 leaner, as required.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method for implementing a thermodynamic cycle comprising the steps of:
   expanding a filly vaporized, high pressure, working fluid stream, transforming a portion of its energy into usable form and producing a returning or spent, low pressure, stream, where the working fluid comprises at least one lower boiling component and at least one higher boiling component;
   evaporating an upcoming liquid working fluid stream using heat from a heating stream from an external heat source, a sufficient portion of the spent, low pressure, stream, and a first portion of a rich vapor sub-stream having an increased concentration of the lower boiling component, where the rich vapor sub-stream is derived from the sufficient portion of the spent, low pressure, stream after the sufficient portion of the spent, low pressure, stream has been partially condensed and separated in heating the upcoming liquid working fluid stream or portion thereof, where the heat is sufficient to form the fully, high pressure, vaporized working stream;
   expanding a second portion of the rich vapor sub-stream and a remainder portion of the spend, low pressure, stream, transforming a portion of its energy into usable form and producing a secondary returning or spent stream;
   completely condensing: the first portion of the rich vapor sub-stream; a lean liquid sub-stream derived from the sufficient portion of the spent, low pressure, stream after the sufficient portion of the spent, low pressure, stream has been partially condensed and separated in heating the upcoming liquid working stream or portion thereof; and the secondary spent stream to form the upcoming liquid working fluid stream; and
   pressurizing the upcoming liquid working fluid stream to a desired high pressure.

2. The method of claim 1, wherein the fully vaporized, high pressure, working fluid stream is superheated.

3. The method of claim 1, wherein the heating stream is a geothermal fluid stream from a geothermal source.

4. The method of claim 1, wherein the evaporating step comprises the steps of:
   pre-heating the upcoming liquid working fluid stream with the first portion of the rich vapor sub-stream to form a pre-heated working fluid stream;
   heating the pre-heated working fluid steam with the sufficient amount of the spent stream to from a heated working fluid stream; and
   fully vaporizing the heated working fluid stream with the heating stream to form the fully vaporized working fluid stream.

5. A method for implementing a thermodynamic cycle comprising the steps of:
   expanding a frilly vaporized working fluid stream, transforming its energy into usable form and producing a returning or spent stream, where the working fluid comprises at least one lower boiling component and at least one higher boiling component;
   evaporating an upcoming heated working fluid stream using heat from a heating stream from an external heat source to form the fully vaporized working fluid stream;
   heating an upcoming pre-heated working fluid steam or portion thereof with a sufficient amount of the spent stream to form the upcoming heated working fluid stream and a partially condensed, sufficient amount of the spent stream;
   pre-heating an upcoming liquid working fluid stream with a first portion of a rich vapor sub-stream having an increased concentration of the lower boiling component derived from the sufficient portion of the spent stream after the sufficient portion of the spent stream has been partially condensed and separated in heating the upcoming pre-heated working fluid stream or portion thereof, to form the upcoming pre-heated liquid working stream and to form a partially condensed, first portion of the rich vapor sub-stream;
   expanding a second portion of the rich vapor sub-stream and a remaining portion of the spent stream, transforming a portion of their energy into usable form and producing a secondary spent stream,
   completely condensing: the partially condensed, first portion of the rich vapor sub-stream; a lean liquid sub-stream derived from the separated sufficient portion of the spent stream and the secondary spent stream to form the upcoming liquid working fluid stream.

6. The method of claim 5, wherein the fully vaporized working stream is superheated.

7. The method of claim 5, wherein the heating stream is a geothermal fluid stream produced by a geothermal source.

8. A method for implementing a thermodynamic cycle comprising the steps of:
   expanding a frilly vaporized working fluid stream, transforming a portion of its energy into usable form and producing a spent stream, where the working fluid comprises at least one lower boiling component and at least one higher boiling component;
   heating an upcoming, pre-heated working fluid stream or a portion thereof using heat from a sufficient portion of the spent stream to from an upcoming heated working fluid stream and a partially condensed sufficient portion of the spent stream;

evaporating the upcoming heated working fluid stream using heat from a heating stream from an external heat source, to form the fully vaporized working fluid stream, where heat from the heating stream and heat from the sufficient portion of the spent stream is equal to or slightly greater than the heat required to fully vaporize the upcoming heated working fluid stream;

separating the partially condensed sufficient portion of the spent stream into a rich vapor sub-stream having an increased concentration of the lower boiling component and a lean liquid sub-stream having a reduced concentration of the lower boiling component;

preheating an upcoming liquid working fluid stream using heat from a first portion of the rich vapor sub-stream to form the pre-heated upcoming working fluid stream and a primary returning stream;

combining a second portion of the rich vapor sub-stream and a remaining portion of the spent stream to form a secondary vapor stream;

expanding the secondary vapor stream, transforming a portion of its energy into usable form and producing a secondary returning stream;

reducing the pressure of the lean liquid sub-stream and combining it with the secondary returning stream to form a combined secondary returning stream;

condensing the combined secondary returning stream with an external cooling fluid stream to form a condensed combined secondary returning stream;

pressurizing the condensed combined secondary returning stream and combining it with the primary returning stream to form a partially condensed returning working fluid stream;

fully condensing the combined returning working fluid stream with a second external cooling fluid stream to form the upcoming liquid working fluid stream; and pressurizing the upcoming liquid working fluid stream of a desired higher pressure.

9. The method of claim 8, wherein the fully vaporized working fluid stream is superheated.

10. The method of claim 8, wherein the heating stream is a geothermal fluid stream from a geothermal source.

11. Apparatus for implementing a thermodynamic cycle comprising:

a high pressure turbine adapted to expand a fully vaporized working stream, transforming a portion of its energy into usable form and producing a spent stream, where the working stream comprises at least one lower boiling component and at least one higher boiling component;

a first heat exchange zone transferring heat from the external heat source to a heated upcoming working stream to form the fully vaporized working stream;

a second heat exchange zone for partially condensing a sufficient portion of the spent stream to form a partially condensed sufficient portion of the spent stream and for transferring heat from the sufficient portion of the spent stream to a pre-heated upcoming working stream;

a pre-heater for partially condensing a first portion of a rich vapor sub-stream separated from the partially condensed sufficient portion of the spent stream and having a higher concentration of the lower boiling component to form a primary spent stream and for transferring heat from the rich vapor sub-stream to an upcoming liquid working stream;

a high pressure turbine adapted to expand a second portion of the rich vapor sub-stream and a remaining portion of the spent stream, transforming a portion of their energy into a usable form and producing a secondary spent stream;

a plurality of condensing heat exchangers adapted to condense a lean liquid sub-stream separated from the partially condensed sufficient portion of the spent stream, the primary spent stream and secondary spent stream into the upcoming liquid working fluid stream.

12. The method of claim 1, wherein an amount of usable energy extracted from the two expanding steps is increased from about 20% to about 30%.

13. The method of claim 5, wherein an amount of usable energy extracted from the two expanding steps is increased from about 20% to about 30%.

14. The method of claim 8, wherein an amount of usable energy extracted from the two expanding steps is increased from about 20% to about 30%.

15. The method of claim 11, wherein an amount of usable energy is increased from about 20% to about 30%.

16. The method of claim 1, further comprising the step of:
heating a remaining portion of the upcoming, pre-heated working stream with the heating stream derived from the evaporating step.

17. The method of claim 5, further comprising the step of:
heating a remaining portion of the upcoming, pre-heated working stream with the heating stream derived from the evaporating step.

18. The method of claim 8, further comprising the step of:
heating a remaining portion of the upcoming, pre-heated working stream with the heating stream derived from the evaporating step.

* * * * *